April 30, 1963 P. J. B. DE NYGORDEN 3,087,382
OPTICAL OPAQUE PROJECTION SYSTEMS
Filed Jan. 26, 1960 5 Sheets-Sheet 1

*INVENTOR.*
Per Johan Berggren de Nygorden.
BY
Homer R. Montague
atty

Per Johan Berggren de Nygorden,
*INVENTOR.*

INVENTOR.
Per Johan Berggren de Nygorden,
BY
Homer L. Montague
atty

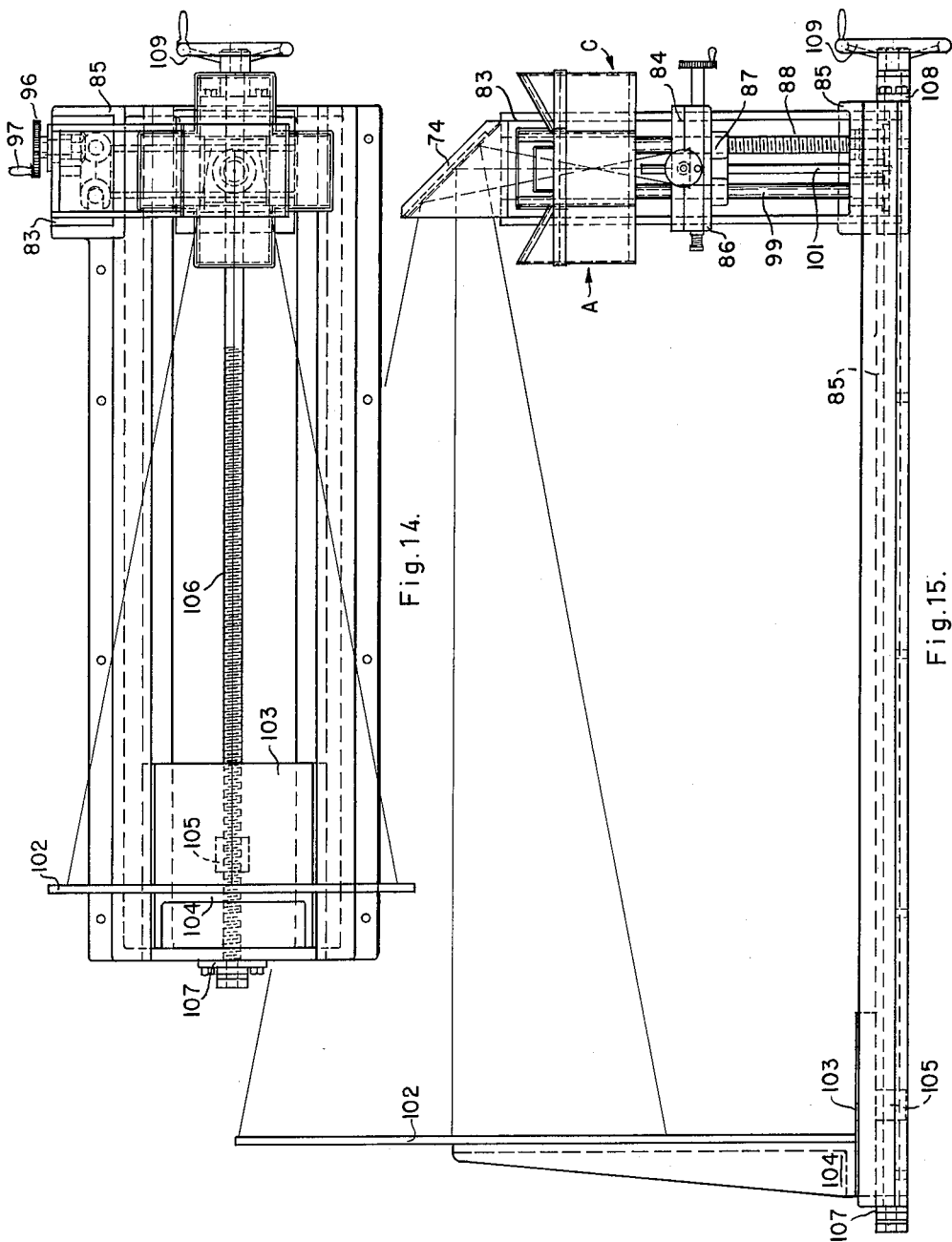

April 30, 1963   P. J. B. DE NYGORDEN   3,087,382
OPTICAL OPAQUE PROJECTION SYSTEMS
Filed Jan. 26, 1960   5 Sheets-Sheet 5

*INVENTOR.*
Per Johan Berggren de Nygorden.
BY
Homer R. Montague
*atty*

United States Patent Office 3,087,382
Patented Apr. 30, 1963

3,087,382
OPTICAL OPAQUE PROJECTION SYSTEMS
Per Johan Berggren de Nygorden, 2965 Decatur Ave.,
New York, N.Y.
Filed Jan. 26, 1960, Ser. No. 4,634
8 Claims. (Cl. 88—26)

This invention pertains to optical projection systems or apparatus, and particularly to what are known as "opaque" projectors; that is, for the projection of luminous images from the surfaces of relatively opaque objects. Systems of this opaque projection type are widely used in industry for the close inspection of either large or small machinery and parts thereof, and are also adapted to a variety of other applications, as will be understood by those skilled in the art of optics.

Since the objects or surfaces being imaged by apparatus of this type are almost never characterized by optimum light-deflection properties, either as to absolute reflectivity or as to the contrast range between their parts of high and low relative reflectivity, the principal problem in the field has been that of obtaining a sufficiently brilliant and contrasty image at the viewing position. Inasmuch as projection optics are available for very high efficiencies of utilization of the light reflected from the objects being viewed, this problem in turn has hinged largely on the ability to provide sufficient incident light from the prime source of illumination. Strong-arm methods which attempt to solve this problem merely by the use of brighter and brighter lamps, however, always entail design compromises or the like which work against the most efficient utilization of the available light, or which involve mechanical or operational drawbacks from the viewpoint of the convenience and comfort of the user.

It is accordingly a principal object of my present invention to provide a system and apparatus for the opaque projection of object surfaces which will overcome the above-noted (and other) objections to prior art approaches, by systematically improving the efficiency of utilization of the available luminous flux, both before and after it has impinged upon the object, to the end that a total luminous source flux of moderate magnitude will yield a projected image of adequate brightness. Among other features, for example, my system takes advantage of an arrangement in which the loss of light due to the operation of Lambert's cosine law for reflection, which states that the luminous intensity from a surface element of a diffusely reflecting surface is proportional to the cosine of the angle between the direction of reflection and the perpendicular to the surface, is minimized. In the case of reflection of rays originating from a significant direction, this law applies equally well to the loss of light due to relatively inclined incidence of the light on the reflecting object, so that the cumulative effect of the law (for equal deviations of the incident and reflected beams from a perpendicular to the surface) is actually proportional to the square of the cosine of that deviation angle.

I am well aware of the attempts which has been made to eliminate the effect of Lambert's law by providing apparatus, such as a light dividing beam splitter, to permit both the incident and the reflected beams to lie directly upon the perpendicular to the surface element. Such light dividers inherently waste something of the order of one-half of the incident beam, and one-half of the reflected beam, because of their dividing nature, and these losses being multiplied, the total loss exceeds any possible gain in final image brightness due to the achievement of perpendicular incidence and reflection. Moreover, while it is in theory possible to recover a portion of the light flux wasted by the dividing surfaces, such refinements always complicate the construction and also involve a certain amount of ray dispersion and the like which reduces the final image contrast, and makes the "effective" brightness of the final image, as judged realistically by the user in a subjective manner, even less attractive.

In general, I accomplish the main and subsidiary aims of the invention by a design and arrangement of the optical parts in such a way that both the angles of incidence and reflection may be maintained as small as possible, consistent with effective utilization of the light, and so that their cosines are as near unity as can practically be accomplished. In addition, I further this principle by dividing the problem of surface illumination of the object into more or less separate regions, so that a plurality, from two up, of actual prime sources of luminous flux are individually allocated to the illumination of spaced but adjacent areas of the object. As will appear from what follows, the arrangement just described permits the use of sources of moderate size and intrinsic brightness to be disposed in an optimum manner from the viewpoint of the cosine-square effect earlier described; especially where bilaterally symmetrical arrangements of even numbers of such sources are used.

Other objects of the invention are to provide an improved double-wall construction of lamp house adapted especially for use with projectors having the main features described above; and to provide a complete opaque projection apparatus well organized into a convenient and efficient whole for the general purposes mentioned herein.

In order to enable those skilled in this art to understand and to practice my invention without difficulty, I will undertake in the following specification to elaborate its principles in connection with certain specific embodiments or constructional examples thereof, but without any purpose to thereby limit the actual scope and spirit of the inventive principles themselves, which are defined in the claims at the end of the specification. These constructional examples are illustrated in the appended drawings, as follows:

FIGURE 10 is a diagram, similar to FIGURE 7, showing the relationship amongst the six separately illuminated object regions.

FIGURE 14 is a top plan view of the complete apparatus including a projector of the type already shown, but to a smaller scale, and mounted on the adjustable screen support table.

FIGURE 15 is a side elevation thereof.

FIGURES 1 through 4 of the drawings illustrate the application of the novel combination of principles of my invention to a simple form of projector in which only two light sources are employed. Consonant with those principles as already stated, the illumination of a given desired object area is accomplished by breaking it up into parts located on opposite sides of the central perpendicular axis of the whole area, the region on each side being illuminated by the light source or system which also lies on the same side of that perpendicular central axis of the area as a whole. In this way, the total angle between the incident and reflected beams (relative to the object area) is minimized, and thereby the cosine-square loss is also minimized; also, the total object area thus illuminated will more nearly agree with the field of the view of the projection lens, and light waste or spill-over will be reduced.

Figure 1:
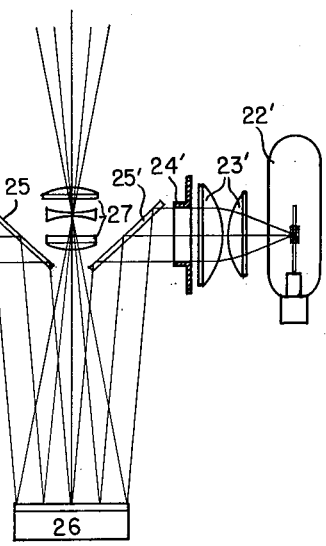
FIGURE 1 is a schematic and diagrammatic illustration of a duplex illuminating system for an opaque projector, including the projection lens and an indication of the object position.

In FIGURE 1, reference numeral 26 designates the opaque object whose upper surface, or a selected portion or area thereof, is to be projected with a desired enlargement ratio onto a suitable viewing screen by a projection lens 27. Numerals 22 and 22' designate the two respective prime light sources such as conventional projector lamps, while 23 and 23' indicate the usual condenser lens sets, 24 and 24' indicate the condenser-aperture defining frames or mounts, and 25, 25' designate two separate plane reflectors so angled as to cause the light from each lamp, after collimation by the corresponding condenser, to fall upon respective halves of the object area to be projected. In this way, the angle of incidence of each parallel beam from a lamp is kept as small as possible on the respective side of the central axis of the illuminated area, and the reflected beam can readily be accurately directed towards the entrance aperture of projection lens 27 and will stay within the beam acceptance angle of the latter.

Figure 2:
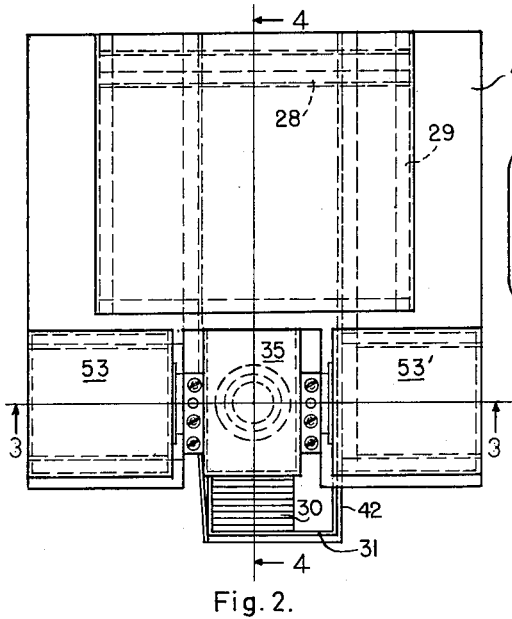
FIGURE 2 is a top plan view illustrating an actual projector employing the duplex system of FIGURE 1.
Figure 3:
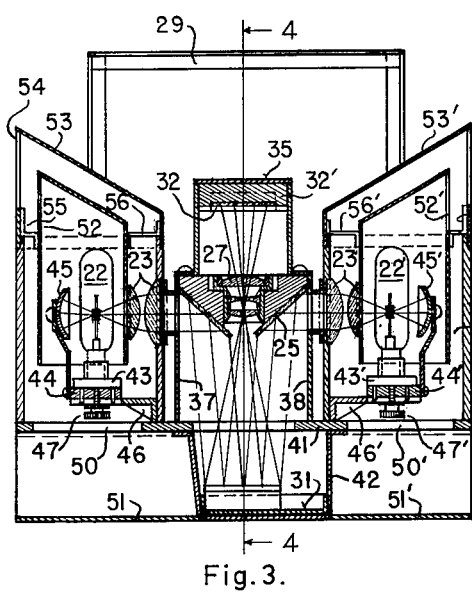
FIGURE 3 is a vertical sectional view of the apparatus of FIGURE 2, taken along line 3—3 thereof (and of FIGURE 4) and looking in the direction of the arrows.
Figure 4:
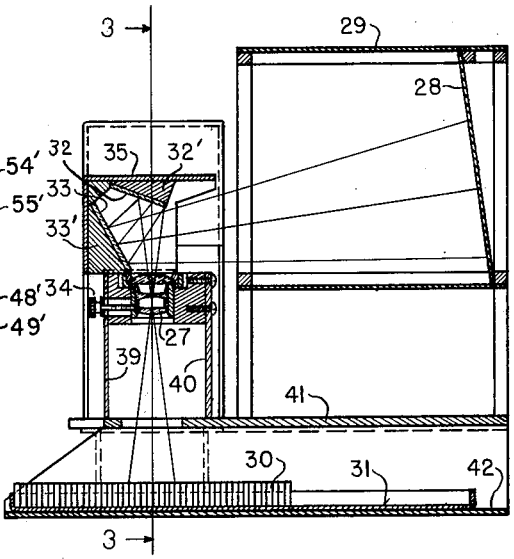
FIGURE 4 is a vertical sectional view taken on line 4—4 of FIGURE 3.

The actual physical construction of a projector employing this optical arrangement is fully illustrated in FIGURES 2, 3 and 4, in which the same parts are designated by the numbers already employed. Viewing screen 28 is placed at the back of an enclosed box or housing 29 having an open front to allow the entrance of the projected image, and also for direct viewing where the screen is of the front projection type. The projector of these figures was designed specifically for the problem of presenting a slightly enlarged view of type faces (such as used for embossing titles on book covers or the like) to enable direct proofreading and inspection thereof; since the type faces themselves are reversed right-to-left, the system is arranged for the necessary inversion to present clear alphabet text letter images for inspection.

Thus, a double reflection in the horizontal plane is necessary to get the letter images right-side-up and in proper reading order. The types 30 are positioned in a movable galley tray or equivalent at 31, and their images are reflected first at reflector 32 and thence at reflector 33 before impinging in focussed condition on screen 28. The focus position of lens 27 can be adjusted in any known or convenient way, as by sliding, helical or rack-and-pinion motion, and a lock screw 34 permits the adjusted position to be maintained as long as wanted for a given installation. The reflectors 32 and 33, with their supporting blocks 32', 33', projector lens block 36 and so on, are all mounted within a housing 35 having opening at its front to permit passage of the projected rays to screen 28. A pair of metal side plates 37 and 38 and an end plate 40 support the lens block 36 in position, and the plates 37, 38 are apertured to permit the passage of the beams from the condensers 23, 23'. A metal end plate 39 is preferably made removable to enable cleaning of the reflectors 25, 25'. These parts are ultimately supported by the floor plate 41, carried on channel 42 and apertured to pass the rays to and from the type slugs, which may thus, with their carrying tray, be moved forward or back to permit line-by-line inspection of the letters and characters in direct fashion.

The lamps 22 and 22' are preferably mounted in respective sockets as at 43 which are mounted as on washers 44 which also support small reflectors 45 as usual in lamp houses of this type. The washers are made movable on brackets such as at 46, for close positioning of the lamp-reflector unit, and locking screws 47 are provided as well known in the art.

FIGURE 3 also shows in detail an unusual form of lamphouse of a nested or double-wall construction, particularly applicable to an arrangement such as this in which the operator will be quite close to the lamps and may touch their housings on occasion.

An incandescent projector lamp gets quite hot in service, and will of course raise its enclosing lamp-house to a high temperature. In the present construction, outer lamphouses such as at 48 are provided, and the direct heat rays from the lamp 22 are prevented from striking this outer shell by a second and inner shell 52, also of metal, and which can thus heat up the outer metal wall only by re-radiation. Large air entrance openings as at 50 are provided in floor 41 under each lamphouse, and air entrance ducts are defined by channels such as at 51 which may also support the main floor 41. That is, they may snugly mate with channels 42.

The inner lamphouses 49 are square metal tubes with open lower ends and slanting closed roofs, the side walls having large rectangular openings 52 which permit the rising heated air to vent through large openings 54 in the outer lamphouses 48, along with rising heated air from between the spaces between the two sets of lamphouse walls. The condensers such as 23 have their rear mounting flanges secured over round openings in front of the lamp filaments, as shown. Each outer lamphouse 48 has an inclined roof or hood 53, and narrow spider brackets 55, 56 support the inner lamphouse in its proper nested position within the outer one.

Figure 5:
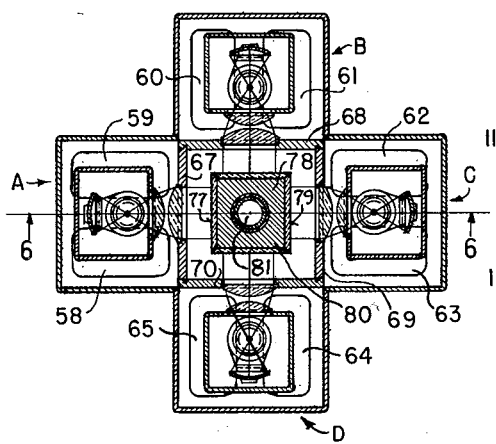
FIGURE 5 is a horizontal sectional view, taken on line 5—5 of FIGURE 6, of a further embodiment of the invention, using a four-light illuminating system.
Figure 6:
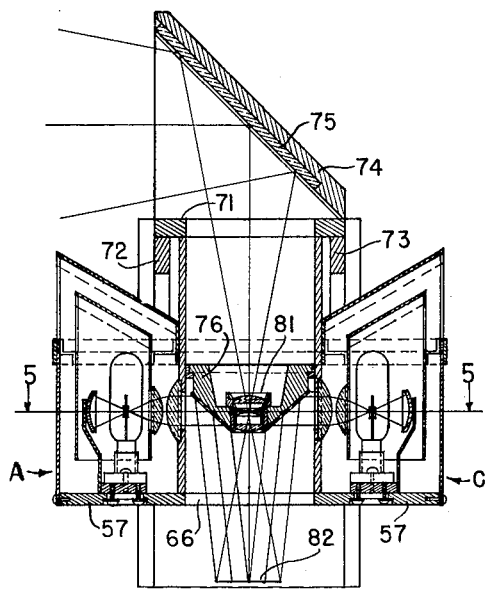
FIGURE 6 is a central vertical sectional view thereof, taken on line 6—6 of FIGURE 5, and showing the direction of the imaging rays proceeding to a screen.
Figure 7:
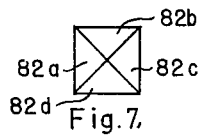
FIGURE 7 is a diagram showing the relationship of four individual areas of an object or object-location, separately illuminated by the four light sources of FIGURE 5.

The principles of the invention as already described can be carried forward and amplified, for apparatus providing higher magnifications and even better image definition, by multiplying the number of sets of symmetrically disposed illumination sources. FIGURES 5 to 7 illustrate a form in which the number of light sources is doubled, providing four units designated by the letters A, B, C and D, of which only one needs to be described in detail, as follows:

Each lamphouse is exactly as already described, including the lamp, its reflector, the provision for adjustment of these two parts as a unit relative to the condensers, and so on. The lamp socket washers are in this case, however, adjustably positioned directly upon the floor plate 57 which has ventilating openings as at 58 and 59 (in pairs) beneath each lamphouse, and the central opening 66 to allow the light to pass to and from the object surface at 82. In the web of floor material beneath each pair of ventilating openings, the lamp socket washers are directly mounted for adjustment as described above. The four inner walls of the four lamphouses, at 67, 68, 69 and 70, extend upwardly from floor plate 57 and are secured to an upper cross plate 71 which is fastened to two cross bars 72 and 73. The reflector base 74 is mounted on plate 71, and reflector 75 is carried by this base at the proper angle for directing the reflected rays to the screen, not shown.

The combined reflector and projections lens pyramidal mounting block 76 is joined to the four lamphouse walls already mentioned, and the four trapezoidal light reflectors 77, 78, 79 and 80, carried on block 76, pick up and reflect the light downward from the lamps to the object at 82. The projection lens 81 gathers the light reflected from the object and forms the image on the screen after reflection at 75. As best illustrated in FIGURE 7, the object area 82 is made up of four partial individual adjacent areas *a, b, c* and *d* which are illuminated respectively by the four light sources on the respective same sides of the central axis of the equipment.

Figure 8:
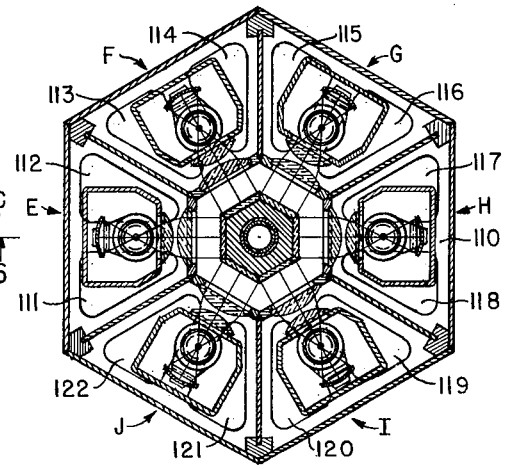
FIGURE 8 is a horizontal sectional view of a further embodiment of the invention, using in this case six symmetrically disposed light sources.
Figure 9:
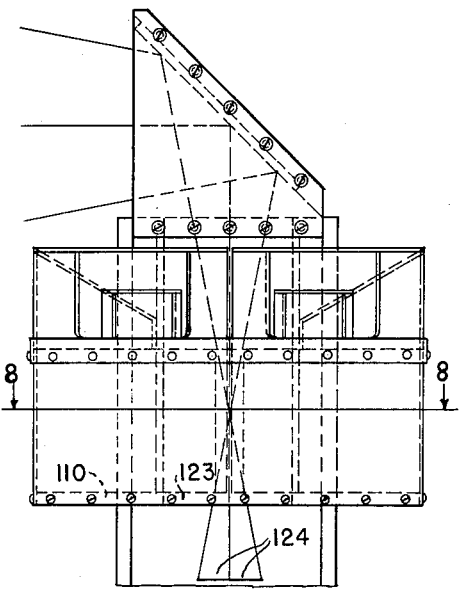
FIGURE 9 is a side elevational view of the same embodiment, showing the housing unit and diagrammatically illustrating the path of the projected image-forming rays.

The way in which the apparatus just described is incorporated into and supported by a suitable mechanical structure will be described below. First, reference to FIGURES 8 through 10 will clarify the application of the optical principles to a six-light arrangement, directly comparable and analogous to the four-light arrangement except that the rectangular configuration of parts in FIGURE 5, for example, becomes the hexagonal configuration of six taper-sided lamphouses as seen in the horizontal section of FIGURE 8. In FIGURE 9, numeral 110 indicates the main floor plate, having a central opening as at 123 for the illuminating and imaging rays passing to and from object area 124. As shown in FIGURE 10, the illuminated object area is in fact made up of six triangular sections *e, f, g, h, i* and *j*. In these diagrams, it will be understood that the boudaries are indicated in idealized form, and that some overlap or irregularity can be tolerated in the shapes of the illuminating beams. The reflectors for the beams issuing from the condensers will here again be trapezoidal, but mounted on six converging faces of a hexagonal pyramid which is truncated across the lens-axis face.

Figures 11, 12, 13:
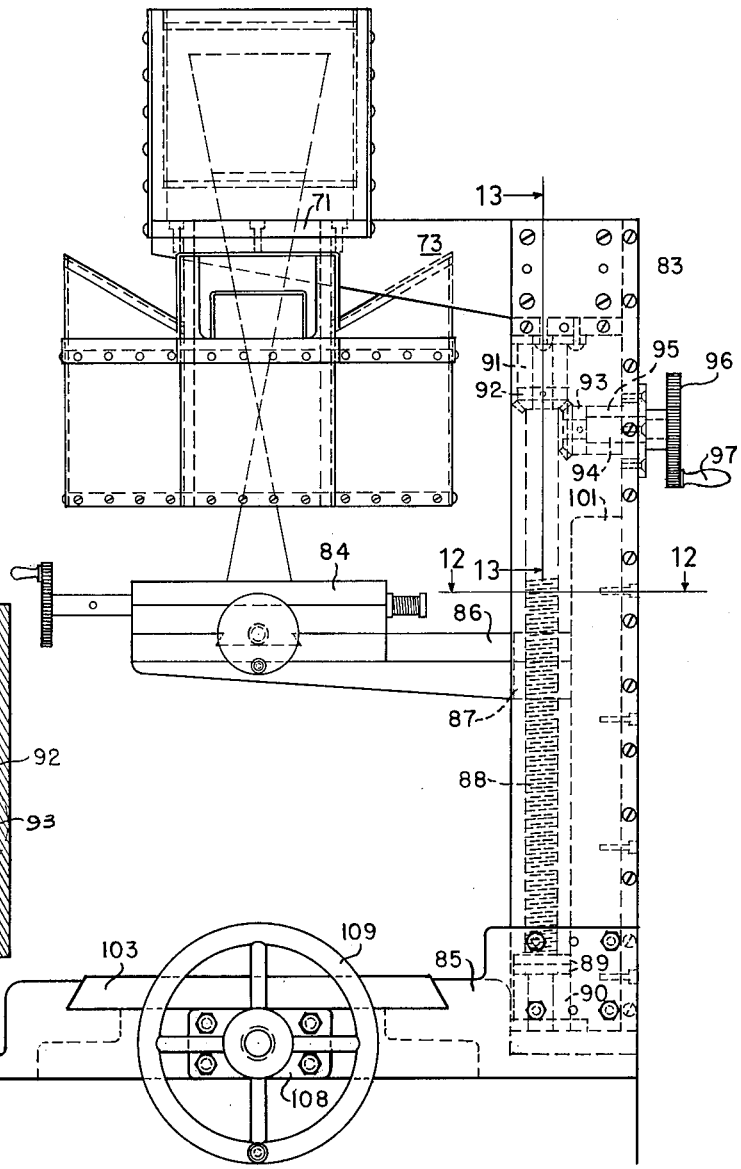
FIGURE 11 is a view in end elevation of an arrangement for mounting the optical projection unit to provide an adjustable focal plane object table and a suitable viewing screen support base.
FIGURE 12 is an enlarged sectional view of a detail of construction of FIGURE 11, taken on line 12—12 thereof.
FIGURE 13 is an enlarged fragmentary sectional view taken on line 13—13 of FIGURE 11, showing the gear drive and guide parts for the focal plane table.
Figure 16:
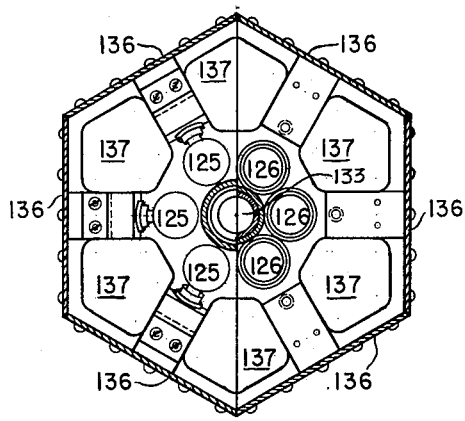
FIGURE 16 is a staggered horizontal sectional view of a modified construction for a six-light projection apparatus, taken on line 16—16 of FIGURE 17.

Any of the projector apparatus of the foregoing FIGURES can advantageously be mounted for use in the equipment of FIGURES 11 to 13. Thus, the support bars 72 and 73 of FIGURE 6 occupy the position represented at the bar 73 in FIGURE 11, extending from the fixed upright beam structure 83 on which is movably carried the adjustable focal plane object table 84 attached to a rigid bed 86 having a threaded hole 87 (FIGURE 12) receiving the threaded shaft 88 for raising and lowering, the shaft having at its end thrust washers 89 and a bearing 90, and being rotated by miter gears 92, 93 adjacent the upper shaft bearing 91 and in turn driven by a shaft 94 in bearing 95 and a hand wheel as shown at 97, preferably with a knurled-rim wheel 96 for fine adjustment.

To ensure smooth and steady vertical motion, without any side swing of the table 84, the bed plate 86 may have a yoke 98 (FIGURE 12) engaging a guide rod 99, anchored to the vertical beam 83. Also, to prevent any bending of shafts 88 and 98, a slide guide plate or bar 101 may be placed in beam structure 83 to guide the heel of the bed plate 86. The table 84 may have usual left and right and transverse motions under the control of other screws and hand wheels or knobs, as shown. Micrometer dials and position indicating scales may be provided on the parts, as required for the particular application in hand.

Since the useful magnification of the projector depends on the distance of the projection screen from the projection lens (the object plane position being adjusted accordingly to follow well-known lens laws), provision is made for a wide range of adjustment of the effective screen distance, as best shown in FIGURES 14 and 15. The equipment already detailed in connection with the description of FIGURE 11 is shown at the right of these figures, similar parts being again marked with the same numerals. As shown, the table or base 85 is a relatively long structures to provide adequate screen distances, and carries a sliding plate 103 in dovetail guides. At its left end, plate 103 mounts an upright support 104 on which screen 102 is fastened. Beneath and secured to plate 103 is a threaded nut element 105 engaging a longitudinal threaded shaft 106 in end bearings 107 and 108 which are secured to the base table. At the projector (right-hand) end of this shaft a hand wheel 109 is provided, rotation of which enables the operator to make desired changes in the screen distance. Here again, suitable table scales or like position-indicating means may be provided in any convenient or well known manner.

FIGURES 16 to 21 illustrate a modification of the projector illuminating system which can be employed in place of those already described. Instead of employing a partitioned and fully controlled individual illuminating system, wherein each light source almost exactly covers its allocated portion of the total area to be projected, this modification is a free plural illuminating system providing a degree of overlap as between the regions illuminated by each lamp system. This is made possible, without departing objectionably from the basic principle of minimizing the incidence and reflection angles, by using special globular projection lamps 125 (six being shown) having very compact concentrated filaments and with about ¾ of the superficial area of each globular lamp envelope covered with silver or reflecting plating, and with a small clear area for the light from the concentrated filament to pass towards the condensers 126. Thus, there is no intermediate reflection of the light passing from source to object, as in the previous forms of the invention, and the illuminated areas can and will overlap to some extent as indicated at 127 in FIGURE 18.

Figure 17:
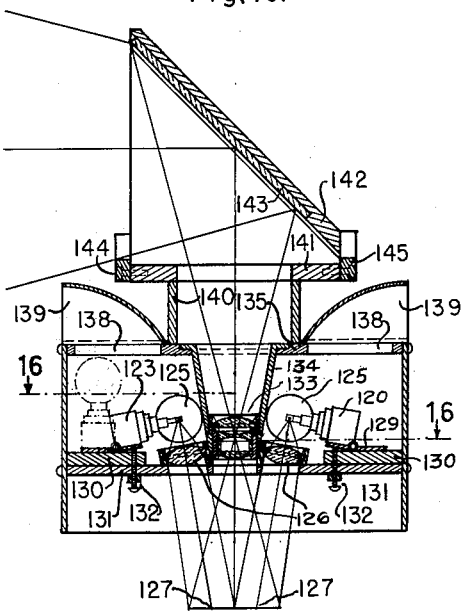
FIGURE 17 is a central vertical sectional view of the same modification, showing the positions of some of the lamps and condensers, the top image reflector, and the projection lens.

The lamps 125 are placed in bayonet-type sockets 128 carried on hinged mounts 129, making it possible to swing the sockets for convenient replacement of lamps, as indicated in dash lines in FIGURE 17. Each lamp socket hinge is attached to a block 130 fastened to the main floor plate 131. The screws 132 threaded through the plate 131 and/or blocks 130 engage the hinge part and permit precise adjustment of the distance of the lamp filament from condenser 126, to provide either collimated, convergent or divergent beams of light to illuminate areas 127, with the overlap indicated in the diagram of FIGURE 18.

Figure 18:
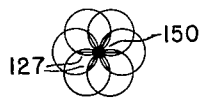
FIGURE 18 is a diagram showing the way in which separate but adjacent illuminated areas are combined in this embodiment to provide a final illuminated region at the object.
Figure 21:
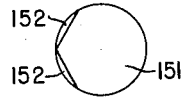
FIGURE 21 is a diagram of an optional masking configuration by which the third or central overlap of luminous areas in FIGURE 18 may be moderated in intensity if desired.

Since there is not only the overlap indicated at 127 in FIGURE 18, but a resultant third central overlap as at 150, it may be desired to reduce excessive central area illumination by suitably masking each of the beams at or adjacent the respective condensers 126, as by a mask plate 151 shown in FIGURE 21, having its segments 152 made opaque at positions nearest the axis of the projector equipment.

Figure 19:
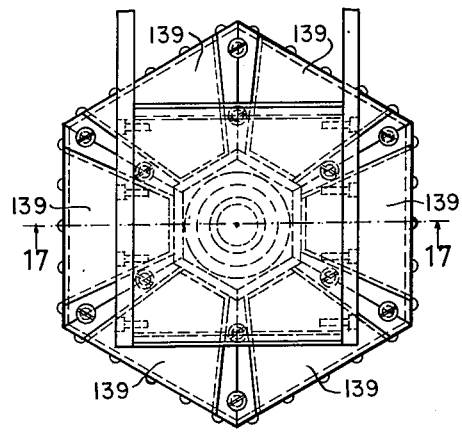
FIGURE 19 is a top plan view of the complete encased projector of the last embodiment, with its mounting bars.
Figure 20:
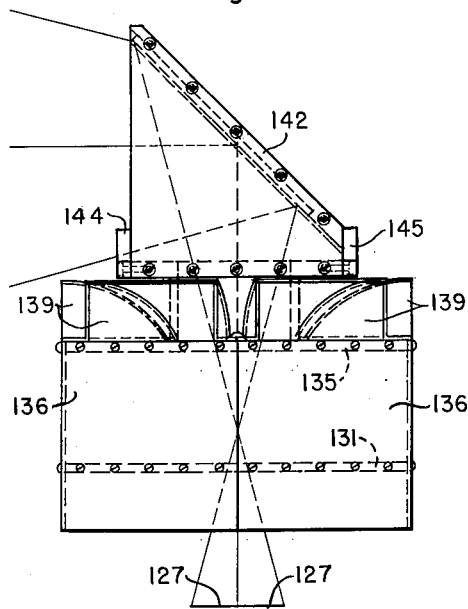
FIGURE 20 is a side elevational view of FIGURE 19.

The projectoin lens 133 fits within the tapered mounting 134 (FIGURE 17) which is fastened to the upper cover plate 135, and the uper and lower plates are joined by six outside cover plates 139 screwed thereto, as in FIGURES 19 and 20. The upper cover plate 135 has six ventillation openings 138, individually covered by hoods 139 attached to the cover plate 135. On the hexagonal extension tube 140 is fastened the cross plate 141 supporting the image reflector mirror 143 on its base 142.

Projector-mounting cross bars 144 and 145 are secured to cross plate 141 and correspond to the support bars 73 of FIGURE 11; that is, they support the whole projector upon the vertical beam 83. The projector thus described is completely interchangeable with the forms earlier described, insofar as its mounting on the main base and screen support is concerned.

From what has been said above as to the construction of the various forms described herein, it will be clear that the shaping of the illuminating beams, and their positioning to illuminate individually allocated parts of the composite area of the object to be projected, can be effected in various ways. Thus, it can be accomplished by the inherent shaping of the beams by the use of angulated reflectors lying on the converging faces of polygonal pyramidal support blocks, as in FIGURES 5, 6 and FIGURES 8, 9 of the drawings, or by the use of auxiliary shaping masks as in FIGURES 17 and 21. However, this basic principle, in combination with the structure by which the total angle between the incident and reflected rays or beams is kept at a minimum, can be accomplished by other devices.

Having described several ways of carrying my invention into practice, I wish it to be understood that the details of construction may be varied by those skilled in this art without departing from the true spirit and scope of my invention, and I therefore do not wish to be limited to the details as shown, except as may be required by the scope of the appended claims.

What is claimed is:

1. Optical projector apparatus for displaying an image of the surface detail of opaque objects, comprising an object support, a projection lens system for projecting onto a viewing screen rays of light from an extended surface of an object on said support, a plurality of object-illuminating light sources disposed at equal distances on opposite sides of the optical axis of said projection lens system and on the same side of said object support as said lens system, and individual object-illuminating beam projector optical systems associated with said light sources and constructed and arranged to direct individual condensed beams of light upon adjacent separate area portions of said extended surface of an opaque object on said object support along respective axes closely bunched about the said optical axis of said projection lens system.

2. Optical projector apparatus for displaying an image of the surface detail of opaque objects, comprising an object support, a projection lens system for projecting onto a viewing screen rays of light from an extended surface of an object on said support, a plurality of object-illuminating light sources disposed at equal distances on opposite sides of the optical axis of said projection lens system and on the same side of said object support as said lens system, and individual object-illuminating beam projector optical systems associated with said light sources and constructed and arranged to direct individual condensed beams of light upon adjacent separate area portions of said extended surface of an opaque object on said object support along respective axes closely bunched about the said optical axis of said projection lens system; each of said object-illuminating systems including beam-shaping means to provide the totality of the illuminating beams with a cross-sectional shape uniformly illuminating a predetermined total area of the opaque object.

3. Optical projector apparatus for displaying an image of the surface detail of opaque objects, comprising an object support, a projection lens system for projecting onto a viewing screen rays of light from an extended surface of an object on said support, a plurality of object-illuminating light sources disposed at equal distances on opposite sides of the optical axis of said projection lens system and on the same side of said object support as said lens system, individual condenser lens systems associated with said light sources to collect their respective luminous rays into condensed beams, and optical means closely encircling the axis of said projection lens system and positioned to direct said beams predominately onto adjacent separate area portions of said extended surface of an opaque object on said object support along directions substantially perpendicular to the said surface of such object.

4. Optical projector apparatus for displaying an image of the surface detail of opaque objects, comprising an object support, a projection lens system for projecting onto a viewing screen rays of light from an extended surface of an object on said support, a plurality of object-illuminating light sources disposed at equal distances on opposite sides of the optical axis of said projection lens system and on the same side of said object support as said lens system, individual condenser lens systems associated with said light sources to collect their respective luminous rays into condensed beams, and optical means disposed closely adjacent the axis of said projection lens system and positioned to direct said beams predominately onto adjacent separate area portions of said extended surface of an opaque object on said object support along directions substantially perpendicular to the said surface of such object.

5. Apparatus in accordance with claim 4, in which said optical means comprises individual shaped reflectors disposed about said axis and lying substantially on the flat trapezoidal faces of a pyramid.

6. Apparatus in accordance with claim 5, in which said reflectors are mounted upon a pyramidal block which is truncated perpendicular to its altitude line.

7. Apparatus in accordance with claim 6, in which said projection lens system is mounted in said block and coaxial with said altitude line.

8. An optical projector apparatus as in claim 2, wherein said beam shaping means comprises a masking plate having opaque segments at positions nearest the optical axis of the projection lens system, to prevent any substantial overlapping of the individual object-illuminating beams at their adjacent edges.

References Cited in the file of this patent

UNITED STATES PATENTS

| | | |
|---|---|---|
| 1,127,504 | Patterson | Feb. 9, 1915 |
| 1,489,988 | Dickinson | Apr. 8, 1924 |
| 1,841,063 | Semenitz | Jan. 12, 1932 |
| 1,887,650 | Larner et al. | Nov. 15, 1932 |
| 2,198,815 | Haskin | Apr. 30, 1940 |
| 2,468,679 | Martin | Apr. 26, 1949 |
| 2,566,185 | Gardner | Aug. 28, 1951 |
| 2,602,370 | Dodin | July 8, 1952 |
| 2,660,087 | Domeshek | Nov. 24, 1953 |
| 2,875,806 | Shuftan | Oct. 28, 1958 |